(12) United States Patent
Cook

(10) Patent No.: US 11,852,804 B2
(45) Date of Patent: Dec. 26, 2023

(54) SCAN MIRROR REFLECTIVITY CALIBRATION METHOD AND APPARATUS

(71) Applicant: Raytheon Company, Waltham, MA (US)

(72) Inventor: Lacy G. Cook, El Segundo, CA (US)

(73) Assignee: Raytheon Company, Tewksbury, MA (US)

( * ) Notice: Subject to any disclaimer, the term of this patent is extended or adjusted under 35 U.S.C. 154(b) by 333 days.

(21) Appl. No.: 17/214,692

(22) Filed: Mar. 26, 2021

(65) Prior Publication Data
US 2022/0308337 A1   Sep. 29, 2022

(51) Int. Cl.
G02B 26/10 (2006.01)
G01N 21/55 (2014.01)
G02B 26/08 (2006.01)

(52) U.S. Cl.
CPC ............ *G02B 26/10* (2013.01); *G01N 21/55* (2013.01); *G02B 26/0816* (2013.01); *G01N 2201/0683* (2013.01)

(58) Field of Classification Search
CPC ..... G02B 26/10; G02B 26/105; G01D 5/3473
See application file for complete search history.

(56) References Cited

U.S. PATENT DOCUMENTS

| | | | | |
|---|---|---|---|---|
| 2004/0107586 A1* | 6/2004 | Nakamura | ........... | G01D 5/2449 33/1 PT |
| 2013/0320190 A1* | 12/2013 | Chu | ............. | G01J 1/0407 362/230 |

FOREIGN PATENT DOCUMENTS

| | | | | |
|---|---|---|---|---|
| CN | 112074708 A | * | 12/2020 | ............... G01D 5/30 |
| JP | 2007101891 A | * | 4/2007 | |
| WO | WO-2011029587 A1 | * | 3/2011 | ......... G01D 5/24438 |

OTHER PUBLICATIONS

*Homo faciens*, "Rotary encoder—sensor arrangement", https://www.youtube.com/watch?v=dPBKTZw_xi4, 2016 (Year: 2016).*
IndustrySearch, "Program an Incremental Rotary Encoder using a Smart Device", Jun. 8, 2016 (Year: 2016).*
Angal et al.; "Monitoring the On-Orbit Calibration of Terra Modis Reflective Solar Bands Using Simultaneous Terra MISR Observations;" IEEE Transactions on Geoscience and Remote Sensing; pp. 1648-1659; (Mar. 2017); vol. 55, Issue 3; <doi: 10.1109/TGRS.2016.2628704 >.
Angal et al.; "Monitoring the On-Orbit Calibration of Terra Modis Reflective Solar Bands Using Simultaneous Terra MISR Observations;" Science Systems and Applications Inc.: Sciences and Exploration Directorate, National Aeronautics and Space Administration; (Dec. 7, 2016); 22 pages.

(Continued)

*Primary Examiner* — Maurice C Smith

(57) ABSTRACT

A scan mirror reflectivity calibration device is provided for monitoring and calibration of a rotating two-sided scan mirror. The scan mirror reflectivity calibration device can comprise at least one light source assembly operable to direct light onto a back side of a rotating two-sided scan mirror. The at least one light source assembly can be mounted outside a swept volume of the rotating two-sided scan mirror. The scan mirror reflectivity calibration device further comprises at least one detector assembly operable to detect light that is emitted from the at least one light source assembly and is reflected off of the back side of the rotating two-sided scan mirror. The at least one detector assembly can be mounted outside the swept volume of the rotating two-sided scan mirror.

26 Claims, 5 Drawing Sheets

(56) References Cited

OTHER PUBLICATIONS

Modis Web; "Optical System;" Moderate Resolution Imaging Spectroradiometer; NASA; (2015); 1 page; (retrieved Feb. 18, 2021); Retrieved from <URL: https://modis.gsfc.nasa.gov/about/optsysdesc.php>.

Modis Web: "Scan Mirror;" Moderate Resolution Imaging Spectroradiometer; NASA; (2015); 1 page; (retrieved Feb. 18, 2021); Retrieved from <URL: https://modis.gsfc.nasa.gov/about/scanmirror.php>.

Xiong et al.; "Assessment of Modis Scan Mirror Reflectance Changes On-Orbit;" Proceedings of SPIE 7081, Earth Observing Systems XIII; (Aug. 20, 2008); pp. 70810B 1-12; vol. 7081; <doi:10.1117/12.792705>.

* cited by examiner

SCAN MIRROR REFLECTIVITY CALIBRATION METHOD AND APPARATUS

BACKGROUND

Certain low earth orbit resource sensors on low earth orbit satellites use a rotating, two-sided scan mirror for directing light from the earth's surfaces onto a focal plane assembly of the sensors. To provide accurate data and imagery, such mirrors are made to be as defect-free as possible, and are made such that both sides of the scan mirror are as close to identical as possible. Over time during use, the surfaces of the mirrors can become contaminated. This contamination can degrade the performance of the mirror over time.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
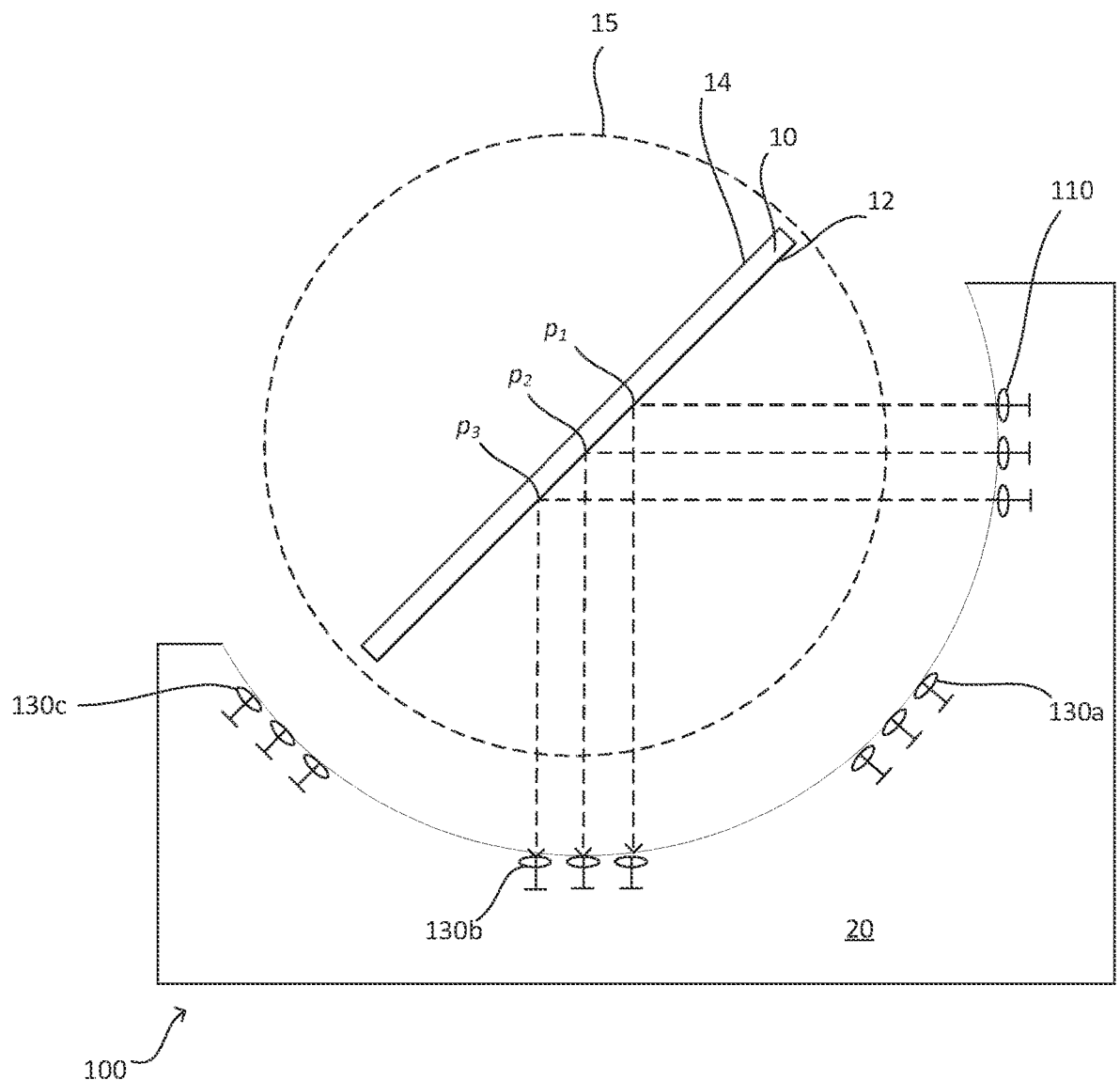
FIG. 1 shows a schematic view of a scan mirror reflectivity calibration device in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

It is desirable to be able to understand the degradation of the scan mirror over time and to be able to calibrate a sensor utilizing the scan mirror based on observed degradation as a function of position, angle, wavelength, and polarization. As such, the present disclosure sets forth a scan mirror reflectivity calibration device for monitoring and calibration of a rotating two-sided scan mirror. The scan mirror reflectivity calibration device can comprise at least one light source assembly operable to direct light onto a back side of a rotating two-sided scan mirror. Each side of the two-sided scan mirror can continually rotate from an outside facing orientation to an inside facing orientation such that each side alternates from a front side at the outside facing orientation to the back side at the inside facing orientation. In other words, depending upon the orientation of the scan mirror, each side can be positioned so as to be the "back side" or "current back side" (and vice versa with respect to the "front side"). The rotation of the rotating two-sided scan mirror can define a swept volume of the rotating two-sided scan mirror, and the at least one light source assembly can be mounted outside the swept volume of the rotating two-sided scan mirror.

The scan mirror reflectivity calibration device further comprises at least one detector assembly operable to detect light that is emitted from the at least one light source assembly and that is reflected off of the current back side of the rotating two-sided scan mirror. The at least one detector assembly can be mounted outside the swept volume of the rotating two-sided scan mirror.

In one example, the scan mirror reflectivity calibration device comprises a first detector assembly and a second detector assembly. The first detector assembly can detect light that is reflected off the back side of the rotating two-sided scan mirror at a first angle, and the second detector assembly can detect light that is reflected off the back side of the rotating two-sided scan mirror at a second angle. The second angle can be different than the first angle, and can correspond to different positions of the rotating two-sided scan mirror. In one example, the first detector assembly can detect light that is reflected off the back side of the rotating two-sided scan mirror at the first angle corresponding to a first position of the rotating two-sided scan mirror. The second detector assembly can detect light that is reflected off the back side of the rotating two-sided scan mirror at the second angle corresponding to at a second position of the rotating two-sided scan mirror. The second position can be different than the first position.

In one example, the first detector assembly can be operable to detect light that is reflected off of the back side of the rotating two-sided scan mirror having a first polarization. The second detector assembly can be operable to detect light that is reflected off of the back side of the rotating two-sided scan mirror having a second polarization. The second polarization can be different than the first polarization. For example, the first detector assembly can comprise a first polarization filter and the second detector assembly can comprise a second polarization filter.

In one example, the first detector assembly can be operable to detect light that is reflected off of the back side of the rotating two-sided scan mirror in a first spectral band. The second detector assembly can be operable to detect light that is reflected off of the back side of the rotating two-sided scan mirror in a second spectral band. The second spectral band can be different than the first spectral band. For example, the first detector assembly can comprise a first spectral bandpass filter. The second detector assembly can comprise a second spectral bandpass filter.

In one example, the at least one light source assembly can comprise a collimator and light emitted from the at least one light source assembly can be collimated light. The at least one light source assembly can comprise an energy output monitor operable to detect light emitted from the at least one light source prior to being reflected off of the rotating two-sided scan mirror. In one example, the at least one light source assembly can comprise an incoherent light source.

The at least on light source assembly can comprise a first light source assembly and a second light source assembly. The first light source assembly can comprise a first polarization filter and the second light source assembly can comprise a second polarization filter. In one example, the first light source assembly can comprise a first spectral bandpass filter and the second light source assembly can comprise a second spectral bandpass filter.

In another example a method can be provided for calibrating and monitoring a rotating two-sided scan mirror. The method can comprise emitting light onto a two-sided scan mirror. Each side of the two-sided scan mirror can continually rotate from an outside facing orientation to an inside facing orientation such that each side alternates from a front side at the outside facing orientation to a back side at the inside facing orientation. Rotation of the rotating two-sided scan mirror can define a swept volume of the rotating two-sided scan mirror. The light can be emitted onto what can be referred to as the current back side of the two-sided scan mirror.

The method can further comprise detecting light reflected from the back side of the rotating two-sided scan mirror from the emitted light, and comparing the detected light to the emitted light. In one example, the method can comprise storing reflectivity data regarding the detected light in a memory and correlating the reflectivity data with a time at which the detected light is detected and a side of the mirror from which the detected light is detected.

In one example, the method can comprise comparing first reflectivity data correlated with a first time stored in the memory and second reflectivity data correlated with a second time stored in the memory to identify degradation of the side of the mirror from which the detected light is detected over time. The detected light can be reflected from the back side of the mirror at different positions on the mirror, and the detected light can be compared to the emitted light at each of the different positions. The detected light can also be reflected from the back side of the mirror at different angles, and the detected light can be compared to the emitted light at each of the different angles. The detected light can also be reflected from the back side of the mirror in different spectral bands, and the detected light can be compared to the emitted light at each of the different spectral bands. The detected light can be reflected from the back side of the mirror in different polarizations, and the detected light can be compared to the emitted light at each of the different polarizations.

In another example, a scan mirror reflectivity calibration device for monitoring and calibration of a rotating two-sided scan mirror is provided. The scan mirror reflectivity and calibration device can comprise at least one light source assembly operable to direct light onto a back side of a rotating two-sided scan mirror. Each side of the two-sided scan mirror can continually rotate from an outside facing orientation to an inside facing orientation such that each side alternates from a front side at the outside facing orientation to the back side at the inside facing orientation. Rotation of the rotating two-sided scan mirror can define a swept volume of the rotating two-sided scan mirror. The at least one light source assembly can be mounted outside the swept volume of the rotating two-sided scan mirror.

The scan mirror reflectivity calibration device can further comprise a plurality of detector assemblies operable to detect light that is emitted from the at least one light source assembly and is reflected off of the back side of the rotating two-sided scan mirror. The plurality of detector assemblies can be mounted outside the swept volume of the rotating two-sided scan mirror.

The scan mirror reflectivity calibration device can further comprise a controller comprising a processor. The processor can be operable to control the at least one light source assembly to direct light onto the back side of the rotating two-sided scan mirror. The processor can also be operable to control the plurality of detector assemblies to detect the light reflected off of the back side of the rotating two-sided scan mirror.

The plurality of detector assemblies can be operable to detect light reflected at different positions on the mirror, detect light reflected at different angles from the mirror; detect light within different spectral bands, and detect light at different polarizations.

The scan mirror reflectivity calibration device can further comprise a memory. The processor can be operable to control the memory to store reflectivity data regarding the detected light detected by the plurality of detector assemblies. The scan mirror reflectivity calibration device can further comprise a transceiver operable to transmit the reflectivity data to an external device.

To further describe the present technology, examples are now provided with reference to the figures. With reference to FIG. 1, a scan mirror reflectivity calibration device 100 is provided. The scan mirror reflectivity calibration device 100 is operable to monitor and facilitate calibration of a rotating, two-sided scan mirror 10 (or simply scan mirror 10). The rotating, two-sided scan mirror 10 is a two-sided mirror that is operable to direct light reflected from the two-sided mirror to a focal plane assembly of a sensor. Such rotating, two-sided scan mirrors can be utilized in, for example, earth observing satellites such as NASA's MODIS satellite, as well as in other applications as recognized by those skilled in the art.

The rotating, two-sided scan mirror 10 can comprise a first side 12 and a second side 14. The scan mirror 10 can be operable to rotate, and the rotation of the scan mirror 10 can define a swept volume 15. The rotating, two-sided scan mirror 10 can be mounted to a housing 20, such as a satellite chassis, and can comprise a motor (not shown) that facilitates the rotation of the scan mirror 10. The first side 12 and the second side 14 can be caused to alternate in position from an outside facing orientation (e.g. an orientation facing away from the housing to actively receive and reflect light from outside the housing 20 onto a sensor of a satellite) and an inside facing orientation (an orientation facing towards the housing). The side of the scan mirror 10 while in the outside facing orientation can be considered a front side of the scan mirror 10, and the side of the scan mirror 10 while in the inside facing orientation can be considered a current back side of the scan mirror 10. Thus, the first side 12 and the second side 14 can alternate from being the front side and the back side of the scan mirror 10 as the scan mirror 10 rotates.

As the scan mirror 10 rotates and the first side 12 and the second side 14 alternate from the front side to the back side, the first side 12 and the second side 14 alternate or take turns reflecting light onto a sensor (i.e. the first side 12 and the second side 14 alternately reflect light onto the sensor when each is on the front side). When the first side 12 or the second side 14 is not being used to reflect light onto the sensor (i.e. when the first side 12 or the second side 14 is currently the back side), the scan mirror reflectivity calibration device 100 can be used to measure the reflectivity of the first side 12 or the second side 14 the scan mirror 10 that is the current back side of the scan mirror 10.

As will be explained in more detail below, the scan mirror reflectivity calibration device 100 can measure the reflectivity of the rotating, two-sided scan mirror 10 over time using different types of measurements based on several different variables. For example, the scan mirror reflectivity calibration device 100 can measure reflectivity over time as a function of the angle of reflection. Further, the scan mirror reflectivity calibration device 100 can measure reflectivity over time as a function of a position on the rotating, two-sided scan mirror 10. Additionally, the scan mirror reflectivity calibration device 100 can measure reflectivity over time as a function of a spectral band. Moreover, the scan mirror reflectivity calibration device 100 can measure reflectivity over time as a function of polarization. Any one of these, or any combination of these, can be analyzed, and in some cases compared to one another, to measure the reflectivity of the scan mirror 10, such as to determine a level of degradation, if any, of the scan mirror 10.

The scan mirror reflectivity calibration device 100 can comprise at least one light source assembly 110. The light source assembly 110 can comprise one or more light sources, such as an LED, a fluorescent light, an incandescent light, or the like. The light source(s) can emit incoherent light, and can be operable to emit light at a specified polarization and/or having a wavelength within a specified spectral band.

As shown in FIG. 1, there can be multiple light source assemblies 110. In the embodiment shown in FIG. 1, there can be a group of light source assemblies 110 that are oriented on the housing 20 to direct light at different positions on the inactive or back side (currently the first side 12 as shown in FIG. 1) of the scan mirror 10. In this example, with the scan mirror 10 in the particular orientation shown in FIG. 1, the light source assemblies can be supported on the housing 20 and positioned or oriented to direct light onto the back side of the scan mirror 10 at a first position $p_1$, a second position $p_2$, and a third position $p_3$, respectively. The number, position and orientation of the light source assemblies 110 in FIG. 1 are exemplary and are not intended to be limiting in any way. Indeed, the light source assemblies 110 can be supported on the housing and positioned and oriented to emit light onto the back of the scan mirror 10 at any desired position. Moreover, each light source assembly can be configured to direct light onto an area of the scan mirror 10, which area is caused to move about the back side of the scan mirror 10 upon rotation of the scan mirror 10 (assuming continuous emission of light during rotation of the scan mirror 10 and rotation of the scan mirror 10). As such, each light source assembly 110 is able to direct light along a path of the back side of the scan mirror 10 as the scan mirror 10 rotates.

The scan mirror reflectivity calibration device 100 can further comprise at least one detector assembly 130 that is operable with and aligned with at least one light source assembly within acceptable tolerances. In the example shown in FIG. 1, multiple detector assemblies 130 are provided and aligned with respective light source assemblies, such as the light source assemblies within the group of light source assemblies 110, including a first group of detector assemblies 130a, a second group of detector assemblies 130b, and a third group of detector assemblies 130c. The groups of detector assemblies 130a, 130b, 130c are supported by and are positioned and oriented on the housing 20 in such as way so that each individual detector assembly is aligned with at least one light source assembly to receive light reflected from the back side of the scan mirror 10 that was emitted from the light source assembly(ies). The light source assemblies and the detector assemblies can both be supported about the housing 20, thus sharing a common structural support base. In another aspect, the fight source assemblies and the detector assemblies can be supported about different housings or structural support bases.

The groups of detector assemblies 130a, 130b, 130c can be positioned and aligned within any specified tolerances, such that they can receive light reflected from the scan mirror 10 at different positions on the scan mirror 10 and at different angles from the scan mirror 10. With the scan mirror 10 oriented as shown in FIG. 1, the second group of detector assemblies 130b are positioned to receive light reflected off of the scan mirror 10 from respective light source assemblies within the group of light source assemblies 110 at the first position $p_1$, the second position $p_2$, and the third position $p_3$.

Each individual light source assembly can be aligned and operable with a respective detector assembly in each of the groups of detector assemblies 130a, 130b, and 130c. Each of the groups of detector assemblies 130a, 130b, 130c can also be operable to detect the reflected light at a desired polarization and/or having a wavelength within a desired spectral band. Thus, the groups of detector assemblies 130a, 130b, 130c can be customizable to receive light at different angles, positions, polarizations, and wavelengths of spectral bands depending on the desired configuration of the individual detector assemblies within each group and the respective light source assemblies.

For example, a first light source assembly within the group of light source assemblies 110 can be aligned with respective first detector assemblies in each of the groups of detector assemblies 130a, 130b, and 130c, and these can be configured to measure polarization at different angular positions of the scan mirror 10. A second light source assembly within the group of light source assemblies 110 can be aligned with respective second detector assemblies in each of the groups of detector assemblies 130a, 130b, and 130c, and these can be configured to measure a wavelength within a desired spectral band. A third light source assembly within the group of light source assemblies 110 can be aligned with respective third detector assemblies in each of the groups of detector assemblies 130a, 130b, and 130c, and these can be configured to measure a different wavelength within a desired spectral band, for instance. Thus, it is contemplated herein, and it will be apparent to those skilled in the art, that a light source assembly can be aligned with one or more detector assemblies to measure the reflectivity of the rotating, two-sided scan mirror 10 over time using a type of measurement based on one of the several different variables discussed herein (e.g., wavelength and polarization).

Figure 2:
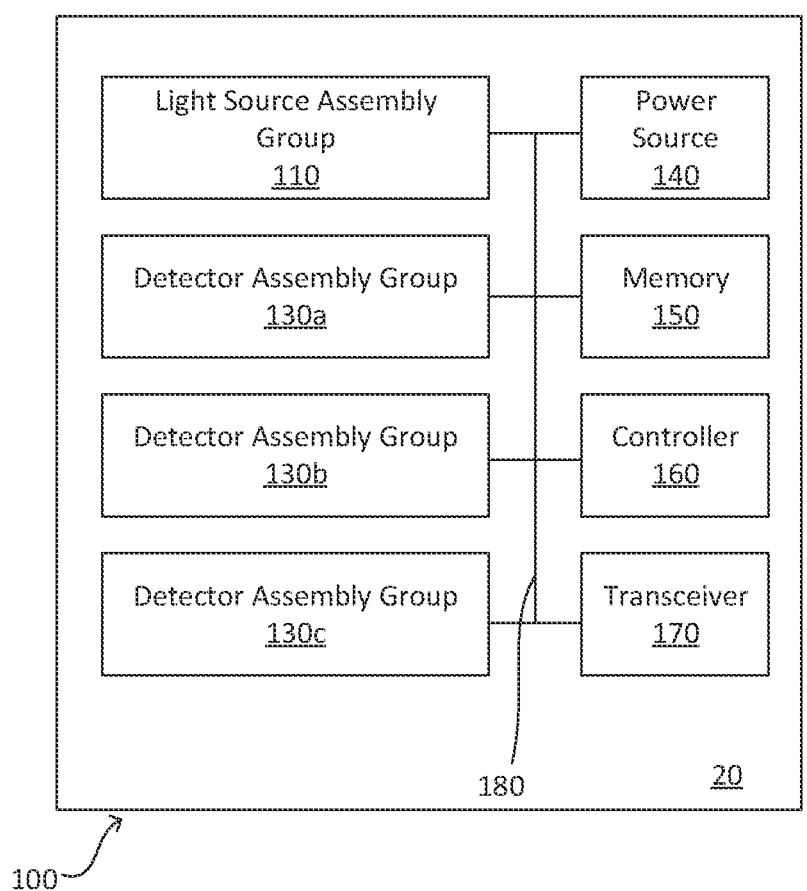
FIG. 2 shows representative components of the scan mirror reflectivity calibration device of FIG. 1.

PG. 2 shows representative components of the scan mirror reflectivity calibration device of FIG. 1. As shown in FIG. 2, the light source assembly 110 and the groups of detector assemblies 130a, 130b, 130c can each be connected to a communications bus 180. The scan mirror reflectivity calibration device 100 can further comprise a power source 140 that is connected to the communications bus 180 that provides power to the light source assembly 110, the groups of detector assemblies 130a, 130b, 130c, and other components of the scan mirror reflectivity calibration device 100. The power source 140 can be any type of power source as will be recognized by those skilled in the art. In one example, the power source 140 can comprise a battery that functions as a power source for a satellite. The power source 140 can also be any other now known or later developed power source such as solar panels, a nuclear power source such as a radioisotope thermoelectric generator, combinations of these, or the like.

The scan mirror reflectivity calibration device 100 can further comprise a memory 150. The memory 150 can store control instructions such as machine readable code or software that when executed by a controller 160 having a processor causes the controller 160 to control various aspects of the scan mirror reflectivity calibration device 100. For example, the controller 160 can control the scan mirror reflectivity calibration device 100 to control power to the light source assembly 110 or the groups of detector assemblies 130a, 130b, 130c, to capture data from one or more of the groups of detector assemblies 130a, 130b, 130c or the like, or individual detector assemblies within the group(s) of detector assemblies 130a, 130b, 130c. The data captured from the groups of detector assemblies can be termed reflectivity data. The memory 150 can also be used to store the reflectivity data received from the groups of detector assemblies 130a, 130b, 130c for real-time or future retrieval, such as to compare reflectivity data received at different times from the groups of detector assemblies 130a, 130b, 130c.

The reflectivity data received from the groups of detector assemblies 130a, 130b, 130c and stored in the memory 150 can be data regarding the reflectivity of the scan mirror 110 correlated to one or more of a position on the scan mirror 110, an angle of reflection off of the scan mirror 110, a polarization, and/or a spectral band of wavelengths. The reflectivity data can be correlated to a time at which the data was obtained by the groups of detector assemblies 130a, 130b, 130c to compare possible changes in the reflectivity data over time, such as changes in the reflectivity data that can indicate degradation of the scan mirror. The reflectivity data can be used to monitor a condition of the scan mirror 110 over time, and can be used in the calibration of output of a sensor using or operable with the scan mirror 110 over time.

The scan mirror reflectivity calibration device 100 can further comprise a transceiver 170. The transceiver 170 is operable to send and receive communications to and from the scan mirror reflectivity calibration device 100. The transceiver 170 can comprise a wired or wireless connection, such as to a satellite controller, or the transceiver 170 can facilitate communication with an external device such as via broadcast radio waves. The transceiver 170 allows data that is stored on the memory 150, such as the reflectivity data collected via the detector assemblies 130a, 130b, 130c, to be communicated from the scan mirror reflectivity calibration device 100 to one or more external devices for the purpose of facilitating analysis of the reflectivity data compiled or collected by the scam mirror reflectivity calibration device 100.

Figure 3:
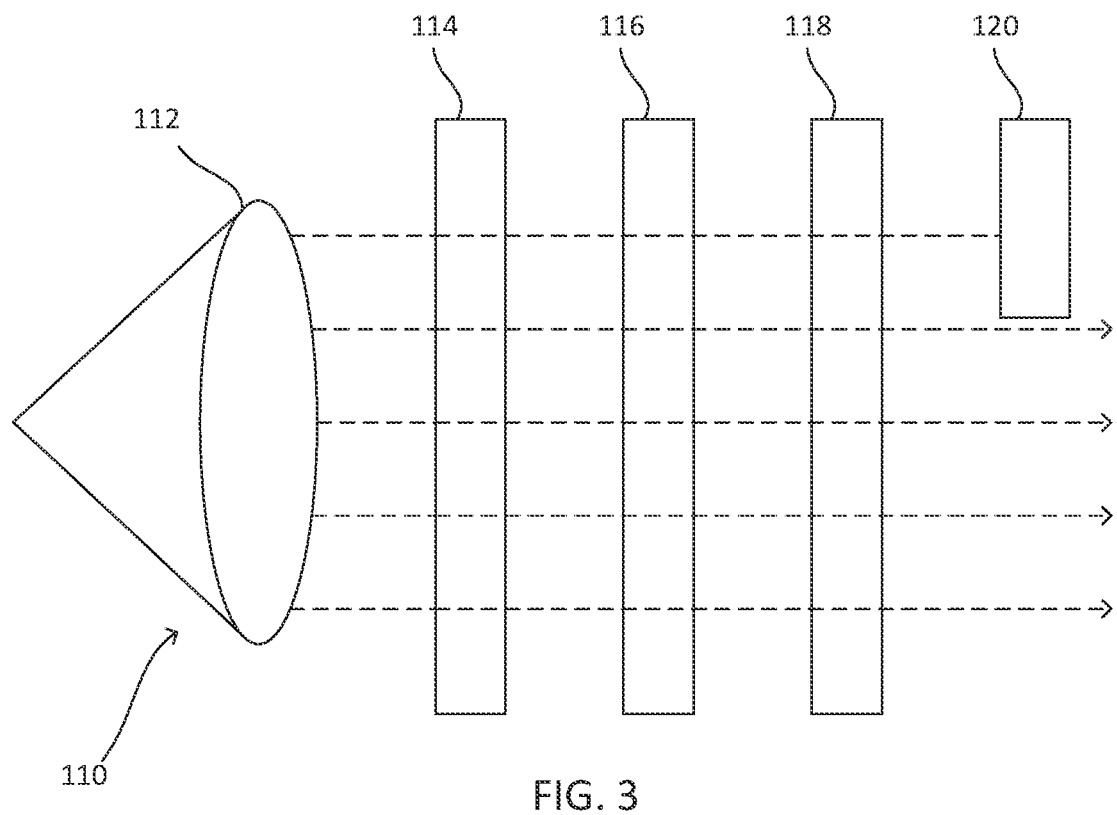
FIG. 3 shows an exemplary light source assembly of the scan mirror reflectivity calibration device of FIG. 1.

FIG. 3 shows an exemplary light source assembly of the scan mirror reflectivity calibration device of FIG. 1. As shown in FIG. 1, the light source assembly 110 can comprise one or more light sources. FIG. 3 illustrates an example fight source 112 of the light source assembly 110 of FIG. 1. The light source 112 can be any number of fight sources and various suitable types of light sources, such as an LED, a fluorescent light, an incandescent light, or the like. The light source 112 can be operable to emit incoherent light. The light source 112 can be configured to emit light at wavelengths within a predetermined spectral band. For example, the light source 112, can be an infrared light source, an ultraviolet light source, a visible light source, or a light source that includes any desired spectral band of wavelengths. Alternatively, the light source 112 can be operated with various suitable filters to achieve light that is caused to be incident on the back side of the scan mirror 10 in different spectral bands.

The light source assembly 110 can further comprise a collimator 114 that filters the light emitted from the light source 112 so that the rays emitted from the light source assembly 110 are substantially parallel. The light source assembly 110 can further comprise a polarizer 116. The polarizer 116 is operable to filter the light emitted from the light source assembly 110 to have a specified polarization. The light source assembly 110 can further comprise a bandpass filter 118. The bandpass filter 118 is operable to filter the light emitted from the light source assembly 110 to include wavelengths within a specified spectral band. Thus, the light source assembly 110 can be configured and customized to emit light at desired polarizations and with wavelengths within desired spectral bands.

The light source assembly 110 can further comprises an energy output monitor 120. The energy output monitor 120 can be configured to detect light emitted from the light source 112 prior to the light being reflected off of a scan mirror (such as the scan mirror 10 in FIG. 1), such as to account for any source variation due to aging or radiation. The energy output monitor 120 can be configured to capture a portion of the light emitted from the light source 112 to monitor whether the light source 112 is operating within in expected parameters, as will be described in more detail below.

Figure 4:
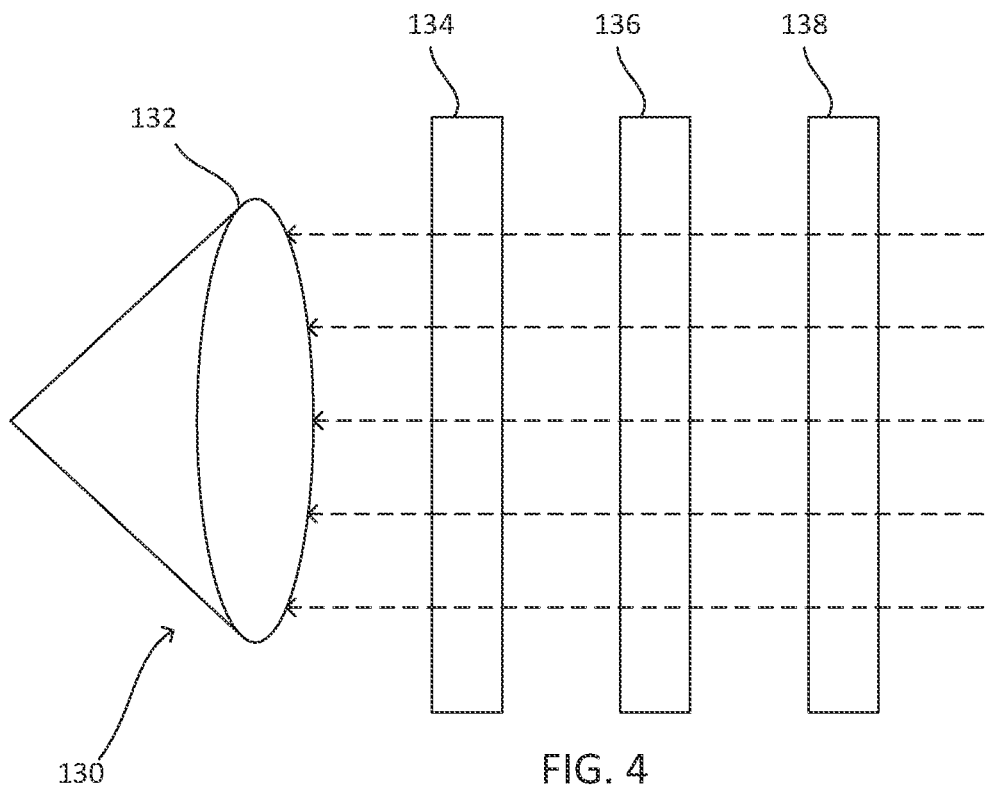
FIG. 4 shows an exemplary detector assembly of the scan mirror reflectivity calibration device of FIG. 1.

FIG. 4 shows an exemplary detector assembly of the scan mirror reflectivity calibration device of FIG. 1. As shown in FIG. 1, a group of detector assemblies 130 can comprise one or more detector assemblies. FIG. 4 illustrates an example detector assembly 132 of a group of detector assemblies of FIG. 1, The detector assembly 130 can comprise a detector 132, which can comprise any number of sensors that are operable to detect light, such as photoconductors (photoresistors), photovoltaic devices (photocells), phototransistors, photodiodes, or the like, as will be apparent to those skilled in the art. The detector assembly 130 can comprise focusing optics 134 that are configured to focus the light received at the detector assembly 130 onto the detector 132.

The detector assembly 130 can further comprise a polarizer 136. The polarizer 136 is operable to filter light received at the detector assembly 130 to have a specified polarization. The detector assembly can comprise a bandpass filter 138. The bandpass filter 138 is operable to filter the light received at the detector assembly 130 to include wavelengths within a specified spectral band. Thus, the detector assembly 130 can be configured and customized to receive and detect light at desired polarizations and with wavelengths within desired spectral bands.

Referring to FIGS. 1-4, the light source assemblies 110 and detector assemblies 130 can thus be customizable to measure reflectivity of the scan mirror 10 at any desired angle, position, wavelength, and/or polarization. The position and the angle can be controlled based on the relative positioning and orientation of the light source assemblies 110 and the detector assemblies. The wavelengths and polarizations can be controlled by including desired polarizers 116, 136 and bandpass filters 118, 138 (or different light source types) at one or more of the light source assemblies 110 and the detector assemblies 130.

For example, a light source assembly (similar to the light source assembly 110) can comprise a light source 112 and collimator 114 and can omit the polarizer 116 and bandpass filter 118. A first detector assembly (similar to the detector assembly 130) can comprise a first polarizer 136 and a first bandpass filter 138, and a second detector assembly (similar to the detector assembly 130) can comprise a second polarizer and a second bandpass filter where the second polarizer has a different polarization than the first polarizer 136 and the second bandpass filter filters for a different spectral band than the first bandpass filter 138. Both the first and second detector assemblies can be configured to receive light reflected off of a scan mirror from the light source assembly, and thus measure reflectivity of the scan mirror at different polarizations and within different spectral bands, Thus, the measurement of reflectivity at any desired polarization or within any desired spectral band can be facilitated via the customization of the light assemblies 110 and the detector assemblies 130.

Figure 5:
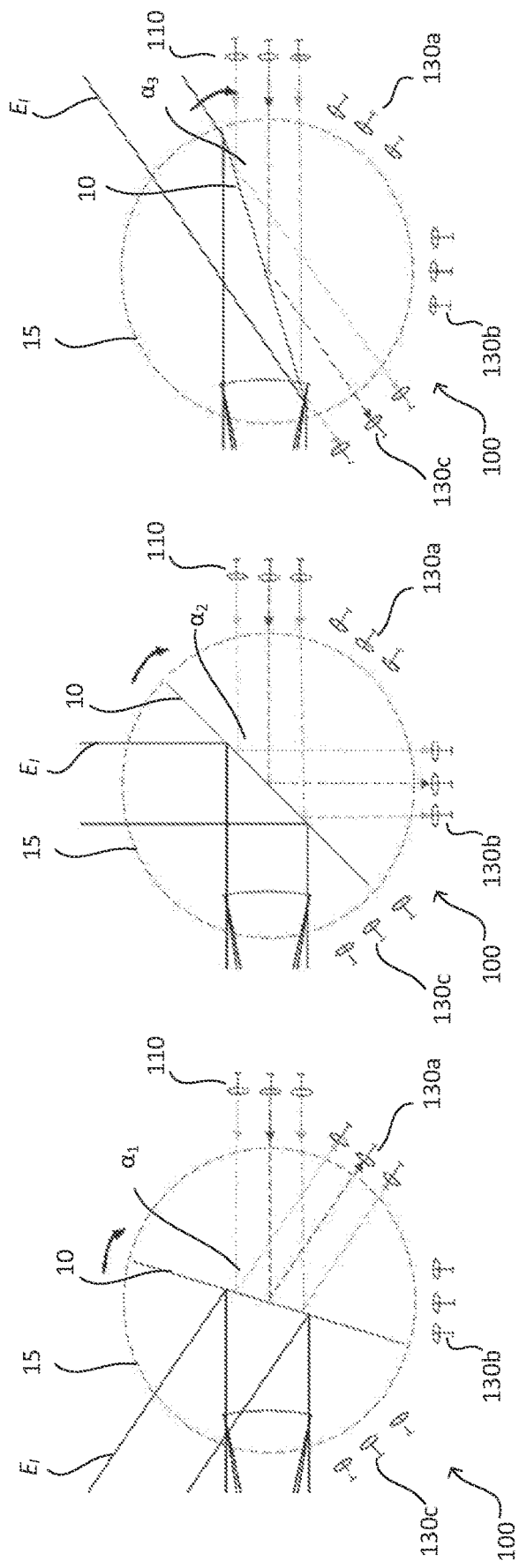
FIG. 5A, FIG. 5B, and FIG. 5O show different operating positions of the scan mirror reflectivity calibration device of FIG. 1.

FIGS. 5A-5C show different operating positions of the scan mirror reflectivity calibration device of FIG. 1. As shown in FIG. 5A-5C, the scan mirror 10 rotates and defines a swept volume 15 as designated by the circular dotted lines, and rotates in a direction as indicated by the arrows. As the scan mirror 10 rotates, the scan mirror reflectivity calibration device 100 can capture the reflectivity of the back side of the scan mirror 10 at different angles based on the positioning of the light source assemblies 110 and the detector assemblies (e.g., detector assemblies 130a, 130b, and 130c) to capture reflectivity data relating to the reflectivity of the scan mirror 10 facilitating degradation detection and calibration of the scan mirror.

In FIG. 5A, the scan mirror 10 is shown in a first position where external light $E_l$ is reflected off a front side of the scan mirror 10 and onto a sensor at a relatively shallow angle, and light emitted from the group of light source assemblies 110 is reflected off of the back side of the scan mirror 10 at an angle $\alpha_1$ onto the first group of light detector assemblies 130a. As the scan mirror 10 continues to rotate, it reaches the position shown in FIG. 5B, where external light $E_l$ is reflected off a front side of the scan mirror 10 and onto the sensor at a substantially perpendicular angle, and light emitted from the group of light source assemblies 110 is reflected off of the back side of the scan mirror at an angle $\alpha_2$ onto the second group of light detector assemblies 130b. Likewise, as the scan mirror 10 continues to rotate, it reaches the position shown in FIG. 5O, where external light $E_l$ is reflected off a front side of the scan mirror 10 and onto a sensor at a relatively large angle, and light emitted from the group of light source assemblies 110 is reflected off of the back side of the scan mirror 10 at an angle $\alpha_3$ onto the third group of light detector assemblies 130c. As shown, the angle $\alpha_2$ is smaller than the angle $\alpha_2$, which is smaller than the angle $\alpha_3$. Thus, the light source assemblies 110 and the light detector assemblies 130a, 130b, 130c are configured to detect and measure light reflected off of the scan mirror 10 from a variety of angular or rotational positions of the scan mirror 10.

It is noted that light can be detected at any other angles in addition to those shown in FIGS. 5A-5C, including angles that are out of the plane shown in FIGS. 5A-5C. In some examples, the angles $\alpha_1$, $\alpha_2$, $\alpha_3$ can range from as little as five degrees to 130 degrees or more depending on the designed operable use range of the scan mirror 10. Indeed, those skilled in the art will recognize that light source assemblies and the light detector assemblies can exist in any number, and can be positioned in any position relative to one another and the scan mirror 10 for the intended purposes discussed herein. As such, the number and position of those shown in the drawings and specifically discussed herein is not intended to be limiting in any way.

Figure 6:
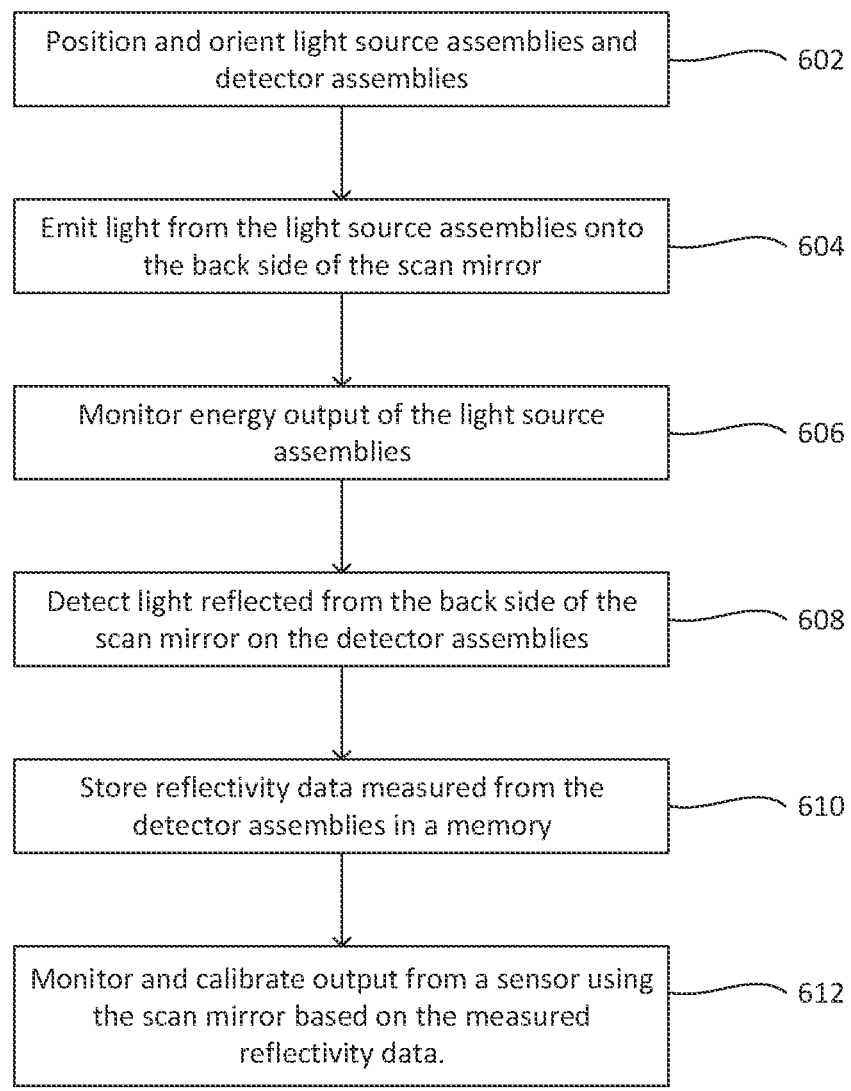
FIG. 6 shows an exemplary method of operating the scan mirror reflectivity calibration device of FIG. 1.

FIG. 6 shows a flowchart depicting an exemplary method of operating the scan mirror reflectivity calibration device of FIG. 1. As set forth in FIG. 6, and referring to FIGS. 1-6, the light source assemblies 110 and the detector assemblies 130a, 130b, 130c can be positioned and oriented on the housing 20 outside the swept volume 15 to detect light reflected off of a back side of the scan mirror 10 at desired positions and angles. Furthermore, the light source assemblies 110 can be configured to emit and the detector assemblies 130a, 130b, 130c can be configured to detect light at specified polarizations and with wavelengths within specified spectral bands.

In step 604, the light source assemblies 110 can be controlled to emit light onto the back side of the scan mirror 10 as the scan mirror 10 rotates through the swept volume 15. For example, the controller 160 can control the light source assemblies 110 to emit light at certain specified times or time intervals, at certain intensities, or the like. In step 606, light emitted from the light source assemblies 110 can be monitored prior to being reflected off of the back side of the scan mirror 10 via energy output monitor 120, such as to account for any source variation due to aging of or radiation affecting the light source assemblies 110. The controller 160 can control the energy output monitor 120 to store data in the memory 150 and the data from the energy output monitor can be compared to an expected output of the light source assemblies. By monitoring the light emitted from the light source assemblies 110 prior to the light being reflected off of the back side of the scan mirror 10, it can be determined whether a change in light detected at a detector assembly 130 is attributable to the reflectivity in the scan mirror 10 as opposed to a problem or a change in the light source assembly 110, such as due to aging or radiation.

In step 608, light is detected at the various detector assemblies 130 as it is reflected from the back side of the scan mirror 10. As mentioned above, the detector assemblies 130 can be configured to detect light at various positions, angles, polarizations, and spectral bands. In step 610, reflectivity data regarding the reflectivity measured by the detector assemblies 130 can be stored in the memory 150. For example, the controller 160 can cause the detector assemblies 130 to store reflectivity data for a measured reflectivity in the memory and can correlate the reflectivity data with one or more of a time, a first side 12 or second side 14 of the scan mirror 10, a polarization, an angle of the scan mirror 10, a position of the scan mirror 10, and a spectral band. In this way, the reflectivity of the scan mirror 10 over time can be measured as a function of position, angle, polarization, and/or spectral band.

In step 612, the scan mirror 10 can be monitored and output from a sensor operable with the scan mirror 10 can be calibrated based on the reflectivity data stored in the memory as obtained from the measured reflectivity. For example, sensor output can be calibrated to compensate for degradation of the mirror over time as measured by the scan mirror reflectivity calibration device, and based on any one of an angle, position, polarization, and/or spectral band. This can be done by comparing stored reflectivity data at any one of an angle, position, polarization, and/or spectral band over time to detect changes in the reflectivity. This can help to ensure that data from a sensor using the scan mirror 10 can be consistent over a duration of its use. Further, by comparing the stored reflectivity data over time, any degradation in the mirror that occurs over time can be detected.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean nonexclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A scan mirror reflectivity calibration device for monitoring and facilitating calibration of a rotating two-sided scan mirror comprising:
    a housing in support of the two-sided scan mirror;
    at least one light source assembly operable to direct light onto a back side of a rotating two-sided scan mirror, wherein each side of the two-sided scan mirror rotates from an outside facing orientation, facing away from the housing to receive light from outside of the housing, to an inside facing orientation, facing towards the housing, such that each side alternates from a front side at the outside facing orientation to the back side at the inside facing orientation, and wherein rotation of the rotating two-sided scan mirror defines a swept volume of the rotating two-sided scan mirror, the at least one light source assembly being mounted outside the swept volume of the rotating two-sided scan mirror; and
    at least one detector assembly aligned with the at least one light source assembly, and operable to detect light that is emitted from the at least one light source assembly and reflected off of the back side of the rotating two-sided scan mirror, the at least one detector assembly being mounted outside the swept volume of the rotating two-sided scan mirror.

2. The scan mirror reflectivity calibration device of claim 1, wherein the at least one detector assembly comprises a first detector assembly and a second detector assembly, wherein the first detector assembly detects light that is reflected off the back side of the rotating two-sided scan mirror at a first angle, and wherein the second detector assembly detects light that is reflected off the back side of the rotating two-sided scan mirror at a second angle, the second angle being different than the first angle.

3. The scan mirror reflectivity calibration device of claim 1, wherein the at least one detector assembly comprises a first detector assembly and a second detector assembly, wherein the first detector assembly detects light that is reflected off the back side of the rotating two-sided scan mirror at a first position of the rotating two-sided scan mirror, and wherein the second detector assembly detects light that is reflected off the back side of the rotating two-sided scan mirror at a second position of the rotating two-sided scan mirror, the second position being different than the first position.

4. The scan mirror reflectivity calibration device of claim 1, wherein the at least one detector assembly comprises a first detector assembly and a second detector assembly, wherein the first detector assembly is operable to detect light that is reflected off of the back side of the rotating two-sided scan mirror having a first polarization, and wherein the second detector assembly is operable to detect light that is reflected off of the back side of the rotating two-sided scan mirror having a second polarization, the second polarization being different than the first polarization.

5. The scan mirror reflectivity calibration device of claim 4, wherein the first detector assembly comprises a first polarization filter and the second detector assembly comprises a second polarization filter.

6. The scan mirror reflectivity calibration device of claim 1, wherein the at least one detector assembly comprises a first detector assembly and a second detector assembly, wherein the first detector assembly is operable to detect light that is reflected off of the back side of the rotating two-sided scan mirror in a first spectral band, and wherein the second detector assembly is operable to detect light that is reflected off of the back side of the rotating two-sided scan mirror in a second spectral band, the second spectral band being different than the first spectral band.

7. The scan mirror reflectivity calibration device of claim 6, wherein the first detector assembly comprises a first spectral bandpass filter and the second detector assembly comprises a second spectral bandpass filter.

8. The scan mirror reflectivity calibration device of claim 1, wherein the at least one light source assembly comprises a collimator and light emitted from the at least one light source assembly is collimated light.

9. The scan mirror reflectivity calibration device of claim 1, wherein the at least one light source assembly comprises an energy output monitor operable to detect light emitted from the at least one light source prior to being reflected off of the rotating two-sided scan mirror.

10. The scan mirror reflectivity calibration device of claim 1, wherein the at least one light source assembly comprises an incoherent light source.

11. The scan mirror reflectivity calibration device of claim 1, wherein the at least one light source assembly comprises a first light source assembly and a second light source assembly, wherein the first light source assembly comprises a first polarization filter and the second light source assembly comprises a second polarization filter.

12. The scan mirror reflectivity calibration device of claim 1, wherein the at least one light source assembly comprises a first light source assembly and a second light source assembly, wherein the first light source assembly comprises a first spectral bandpass filter and the second light source assembly comprises a second spectral bandpass filter.

13. A method for calibrating and monitoring a rotating two-sided scan mirror, the method comprising:

emitting light onto a two-sided scan mirror mounted to a housing, wherein each side of the two-sided scan mirror rotates an outside facing orientation, facing away from the housing to receive light from outside of the housing, to an inside facing orientation, facing towards the housing, such that each side alternates from a front side at the outside facing orientation to a back side at the inside facing orientation, and wherein rotation of the rotating two-sided scan mirror defines a swept volume of the rotating two-sided scan mirror, the light being emitted onto the back side of the two-sided scan mirror;

detecting light reflected from the back side of the rotating two-sided scan mirror from the emitted light; and comparing the detected light to the emitted light.

14. The method of claim 13, further comprising storing reflectivity data regarding the detected light in a memory and correlating the reflectivity data with a time at which the detected light is detected and a side of the mirror from which the detected light is detected.

15. The method of claim 14, further comprising comparing first reflectivity data correlated with a first time stored in the memory and second reflectivity data correlated with a second time stored in the memory to identify degradation of the side of the mirror from which the detected light is detected over time.

16. The method of claim 13, wherein the detected light is reflected from the back side of the mirror at different positions on the mirror, and the detected light is compared to the emitted light at each of the different positions.

17. The method of claim 13, wherein the detected light is reflected from the back side of the mirror at different angles, and the detected light is compared to the emitted light at each of the different angles.

18. The method of claim 13, wherein the detected light is reflected from the back side of the mirror in different spectral bands, and the detected light is compared to the emitted light at each of the different spectral bands.

19. The method of claim 13, wherein the detected light is reflected from the back side of the mirror in different polarizations, and the detected light is compared to the emitted light at each of the different polarizations.

20. A scan mirror reflectivity calibration device for monitoring and calibration of a rotating two-sided scan mirror comprising:

a housing in support of the rotating two-sided scan mirror;

at least one light source assembly operable to direct light onto a back side of a rotating two-sided scan mirror, wherein each side of the two-sided scan mirror rotates from an outside facing orientation, facing away from the housing to receive light from outside of the housing, to an inside facing orientation, facing towards the housing, such that each side alternates from a front side at the outside facing orientation to the back side at the inside facing orientation, and wherein rotation of the rotating two-sided scan mirror defines a swept volume of the rotating two-sided scan mirror, the at least one light source assembly being mounted outside the swept volume of the rotating two-sided scan mirror;

a plurality of detector assemblies operable to detect light that is emitted from the at least one light source assembly and reflected off of the back side of the rotating two-sided scan mirror, the plurality of detector assemblies being mounted outside the swept volume of the rotating two-sided scan mirror; and a controller comprising a processor operable to control the at least one light source assembly to direct light onto the back side of the rotating two-sided scan mirror, and to control the plurality of detector assemblies to detect the light reflected off of the back side of the rotating two-sided scan mirror.

21. The scan mirror reflectivity calibration device of claim 20, wherein the plurality of detector assemblies are operable to detect light reflected at different positions on the mirror.

22. The scan mirror reflectivity calibration device of claim 20, wherein the plurality of detector assemblies are operable to detect light reflected at different angles from the mirror.

23. The scan mirror reflectivity calibration device of claim 20, wherein the plurality of detector assemblies are operable to detect light within different spectral bands.

24. The scan mirror reflectivity calibration device of claim 20, wherein the plurality of detector assemblies are operable to detect light at different polarizations.

25. The scan mirror reflectivity calibration device of claim 20, further comprising a memory wherein the processor is operable to control the memory to store reflectivity data regarding the detected light detected by the plurality of detector assemblies.

26. The scan mirror reflectivity calibration device of claim 22, further comprising a transceiver operable to transmit the reflectivity data to an external device.

* * * * *